United States Patent [19]

Brown et al.

[11] 3,862,178

[45] Jan. 21, 1974

[54] PROCESS FOR THE PRODUCTION OF CYCLOPENTENE INTERMEDIATE AND INTERMEDIATES OBTAINED THEREFROM

[75] Inventors: Edward Douglas Brown; Richard Clarkson, both of Macclesfield, England

[73] Assignee: Imperial Chemical Industries Limited, London, England

[22] Filed: Apr. 30, 1973

[21] Appl. No.: 355,734

[30] Foreign Application Priority Data
May 10, 1972 Great Britain.................... 21798/72

[52] U.S. Cl.......... 260/240 R, 424/305, 260/468 D, 260/586 R, 260/598, 260/611 R
[51] Int. Cl................................................ C07d 5/06
[58] Field of Search.................... 260/343.3, 240 PG

[56] References Cited
UNITED STATES PATENTS
3,778,461   12/1973   Brown et al. ..................... 260/343.3

OTHER PUBLICATIONS

Meinwald et al., J. Am. Chem. Soc., vol. 80, pp. 6303 to 6305 (1958).
Crabbe et al., Tetrahedron Letters, No. 2, pp. 115–117 (1972).
Corey et al., Tetrahedron Letters, No. 2, pp. 111–113 (1972).
Corey et al., Tetrahedron Letters, No. 2, pp. 107 to 109 (1972).
Taub et al., Chem.. Commun., 1970, p. 1258 et seq. (copy unavailable in POSL, relied upon as abstracted by Axen et al., infra.) On order from Lib. of Congress.
Axen et al., Synthesis of Natural Products (Chapter on The Total Synthesis of Prostaglandins), pages 81, 92 to 94 and 142 (1973), (original copy in Patent Office cannot be located to determine exact date of the book-copies made from copies of part of book, i.e., pp. 81 to 142 in Gp. 120, exact date to be ascertained, however, subject matter in this book is based on 1970 publication above to be obtained, therefore, applicable subject matter against the claims).

*Primary Examiner*—John D. Randolph
*Attorney, Agent, or Firm*—Cushman, Darby & Cushman

[57] ABSTRACT

A novel acid-catalysed rearrangement process to convert 7-substituted-1-oxabicyclo[3,2,1]octane derivatives to 4$\beta$-substituted-1,2,3,3a$\alpha$,4,6a$\beta$-hexahydro-2-oxo-1-oxapentalene derivatives, which are useful intermediates, some of them novel, for the manufacture of prostaglandins, and prostaglandin-like compounds, of the A-series and 11-desoxy series.

6 Claims, No Drawings

PROCESS FOR THE PRODUCTION OF CYCLOPENTENE INTERMEDIATE AND INTERMEDIATES OBTAINED THEREFROM

This invention relates to a novel process for use in the manufacture of prostaglandin derivatives, particularly of prostaglandins and prostaglandin-like compounds of the A-series, and of the 11-desoxy series; and to novel cyclopentene intermediates produced by said process.

Thus, according to the invention there is provided a process for the production of cyclopentene intermediates of the formula:

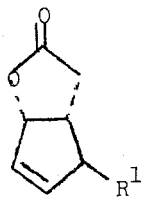

I wherein $R^1$ is a protected hydroxymethyl radical, a protected formyl radical or a protected 3-hydroxy-1-trans-alkenyl radical of 4 to 11 carbon atoms, which intermediates are useful for the manufacture of prostaglandins, or prostaglandin-like compounds, of the A-series or of the 11-desoxy series, which comprises the rearrangement of an oxa-bicyclo-octene derivative of the formula:

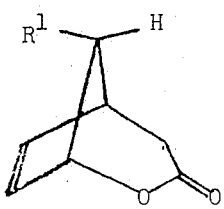

II wherein $R^1$ has the meaning stated above, by reaction thereof with an acid.

A suitable value for $R^1$ when it is a protected hydroxymethyl radical is, for example, an alkanoyloxymethyl radical of 2 to 8 carbon atoms, for example the acetoxymethyl radical, or an α-phenylalkoxymethyl radical of 8 to 12 carbon atoms, for example a benzyloxymethyl radical. A suitable value for $R^1$ when it is a protected formyl radical is, for example, a formyl group protected as an acetal, for example a dialkoxymethyl radical of 3 to 8 carbon atoms, for example the dimethoxymethyl radical. A suitable value for $R^1$ when it is a protected 3-hydroxy-1-trans-alkenyl radical is, for example, a 3-alkanoyloxy-1-trans-alkenyl radical wherein the alkanoyl group contains 1 to 4 carbon atoms, for example the 3-acetoxy-1-trans-octenyl or 3-acetoxy-1-trans-decenyl radical, or $R^1$ is a 3-(tetrahydropyran-2-yloxy)-1-trans-alkenyl radical, for example the 3-(tetrahydropyran-2-yloxy)-1-trans-octenyl or 3-(tetrahydropyran-2-yloxy)-1-trans-decenyl radical.

The rearrangement of the bicycloheptene derivative of the formula II may be carried out in the presence of a strong acid, for example an inorganic acid, for example hydrochloric acid or sulphuric acid, or an organic acid, for example an alkanesulphonic acid of 1 to 6 carbon atoms, for example methanesulphonic acid, or an arenesulphonic acid of 6 to 10 carbon atoms, for example toluene-p-sulphonic acid, by mixing the acid and the bicycloheptene derivative in an inert solvent, for example benzene or toluene, at ambient temperature or at an elevated temperature, for example the reflux temperature of the solvent, for up to 25 hours.

The starting material of the formula II wherein $R^1$ is a protected hydroxymethyl radical may be obtained by reacting a 5-(protected hydroxymethyl)cyclopenta-1,3-diene (III), for example 5-benzyloxymethylcyclopenta-1,3-diene (III, $R^2$=benzyl) or 5-(lower alkanoylmethyl) cyclopenta-1,3-diene, with an acrylic acid derivative (IV), for example 2-chloroacryloyl chloride (IV, $R^3$ = chlorine, $R^4$ = choroformyl), in a Diels-Alder reaction to give a bicycloheptene derivative V. The bicycloheptene derivative V is then hydrolysed to a ketone VI, which is oxidised in a Baeyer Villiger reaction to the required oxa-bicyclo-octene VII (II, $R^1$ = protected hydroxymethyl).

The starting material of the formula II wherein $R^1$ is a protected formyl radical may be obtained by reacting for example α-acetoxyfulvene (VIII) in a Diels-Alder reaction with an acrylic acid derivative (IV), for example 2-chloroacryloyl chloride (IV, $R^3$ = chlorine, $R^4$ = chloroformyl), 2-chloroacrylo-nitrile or a lower alkyl ester of 2-chloroacrylic acid, to give a bicycloheptene derivative IX, which is hydrolysed to give a 5-anti*-carbaldehyde X.

*anti- signifies a substituent on the opposite side of the C-7 bridge from the double bond.

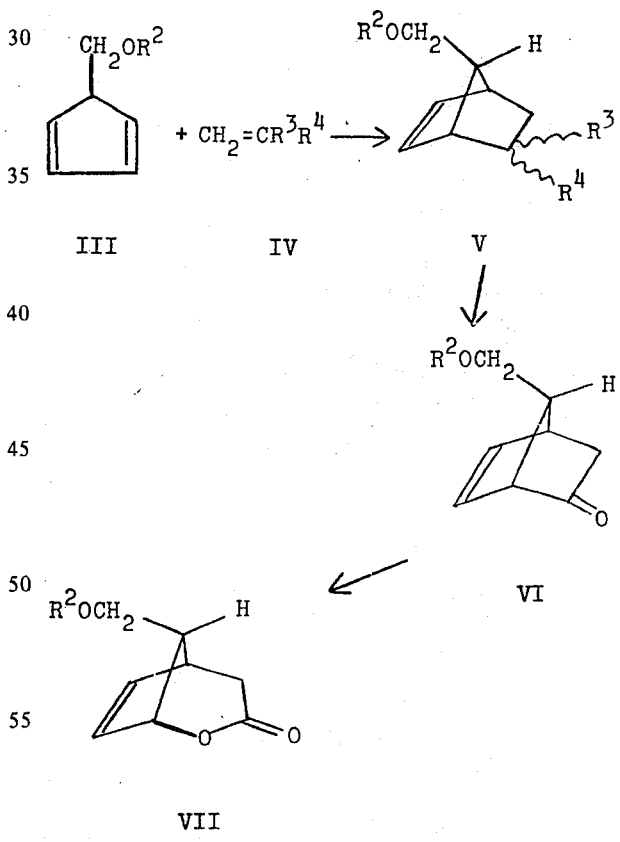

The anti-carbaldehyde is isomerised by acid or in the presence of an amine to the corresponding syn-carbaldehyde XI, and the formyl group is converted to an acetal XII, for example the dimethyl acetal (XII, $R^5$ = methyl). Hydrolysis converts the groups $R^3$ and $R^4$ to the oxo radical of a ketone XIII, Baeyer-Villiger oxidation of which gives the required starting material XIV (II, $R^1$ = dimethoxymethyl).

The compounds of the formula II wherein R¹ is a protected derivative of a 3-hydroxy-1-trans-alkenyl derivative, which may be used as starting material in the process of the invention, may be obtained by reaction of a 7-syn-carbaldehyde of the formula XI with a phosphonate reagent of the formula $(CH_3O)_2PO.CH.COR^6$ (wherein R⁶ is a branched- or straight- chain alkyl radical of 1 to 8 carbon atoms) to give a compound of the formula XV. The ketone group is reduced with either zinc borohydride or aluminium tri-isopropoxide to the enol XVI, and the groups R³ and R⁴ are hydrolysed to the oxo group of the ketone XVII. The side-chain hydroxyl is then protected, for example as a lower alkanoyl ester or tetrahydropyran-2-yl ether, to give the required starting material XVIII (R⁷ = lower alkanoyl or tetrahydropyran-2-yl).

Certain of the cyclopentene intermediates of the formula I are novel compounds. Thus, according to a further feature of the invention there is provided a cyclopentene derivative of the formula:

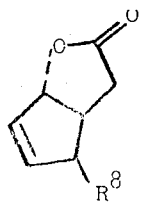

XIX wherein R⁸ is an alkanoyloxymethyl radical of 4 to 8 carbon atoms, a protected formyl radical or a protected

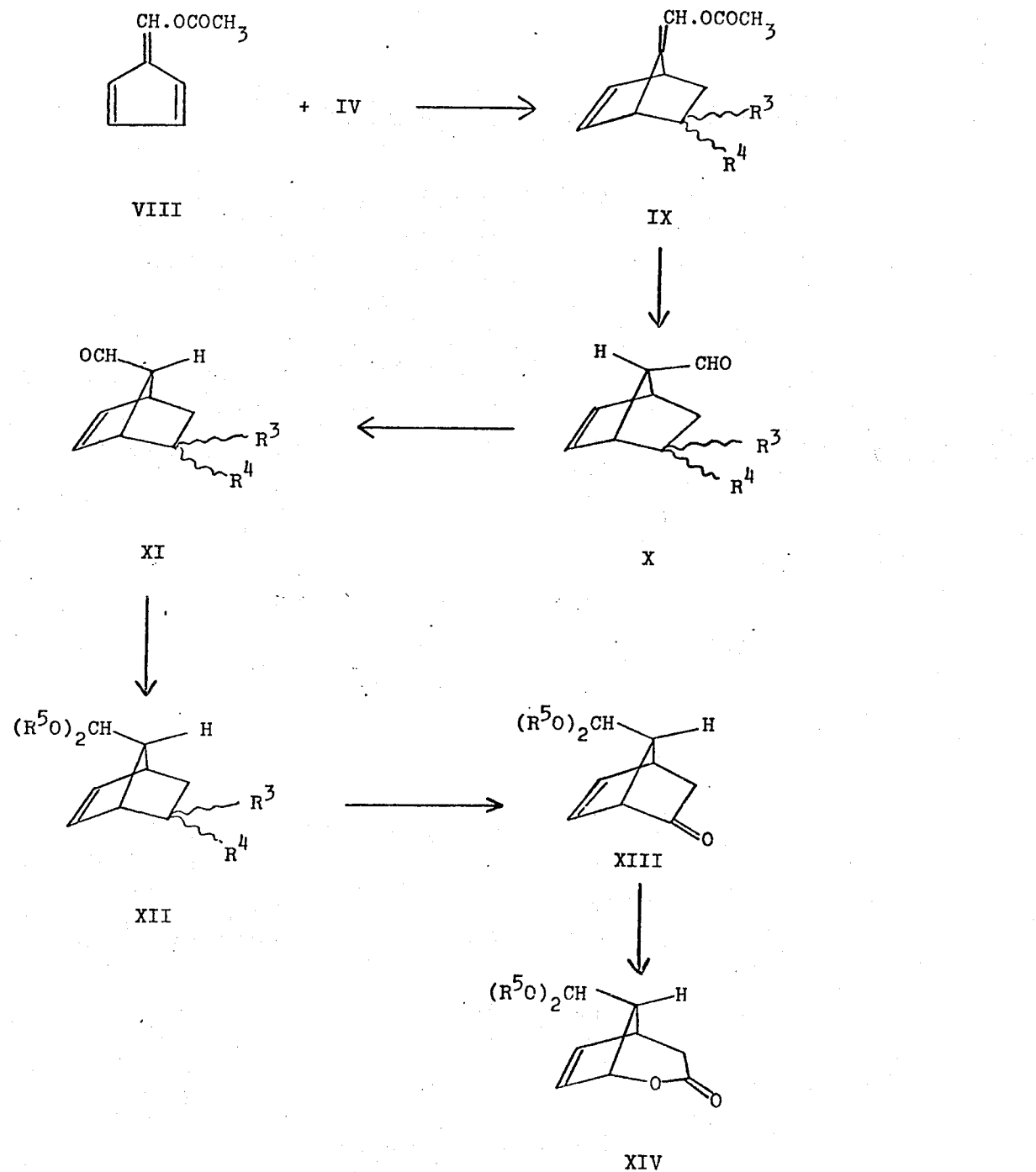

3-hydroxy-1-trans-alkenyl radical of 4 to 11 carbon atoms.

A suitable protected formyl radical, and a suitable protected 3-hydroxy-1-trans-alkenyl radical are those defined above.

The compounds of the formula XIX may be converted to known intermediates for prostaglandins and prostaglandin-like compounds of the A series or the 11-desoxy series by conventional reactions known in the field of prostaglandin chemistry.

Thus, for example, compounds of the formula XIX wherein $R^8$ is an alkanoyloxymethyl radical of 4 to 8 carbon atoms may be used in the synthesis of A prostaglandins or prostaglandin-like compounds, in the same way as the known compound I ($R^1$ = acetoxymethyl), from which A prostaglandins are available directly.

prostaglandin-like compounds.

Compounds of the formula XIX, wherein $R^8$ is a protected formyl group, may be converted to a compound of the formula XIX, wherein $R^8$ is a protected 3-hydroxy-1-trans-alkenyl radical, which may then be converted to a prostaglandin, or prostaglandin-like compound of the A-series, by conventional reactions known in the field of prostaglandin chemistry.

Thus, for example, the compound XIXa, ($R^8$ = dimethoxymethyl), the product described in Example 1 hereafter, may be hydrolysed to give the aldehyde XX, which is reacted with a dimethyl 2-oxoalkylphosphonate, for example dimethyl 2-oxoheptylphosphonate, in the presence of a strong base, to give the enone XXI. Reduction of the enone to the enol XXII with, for ex-

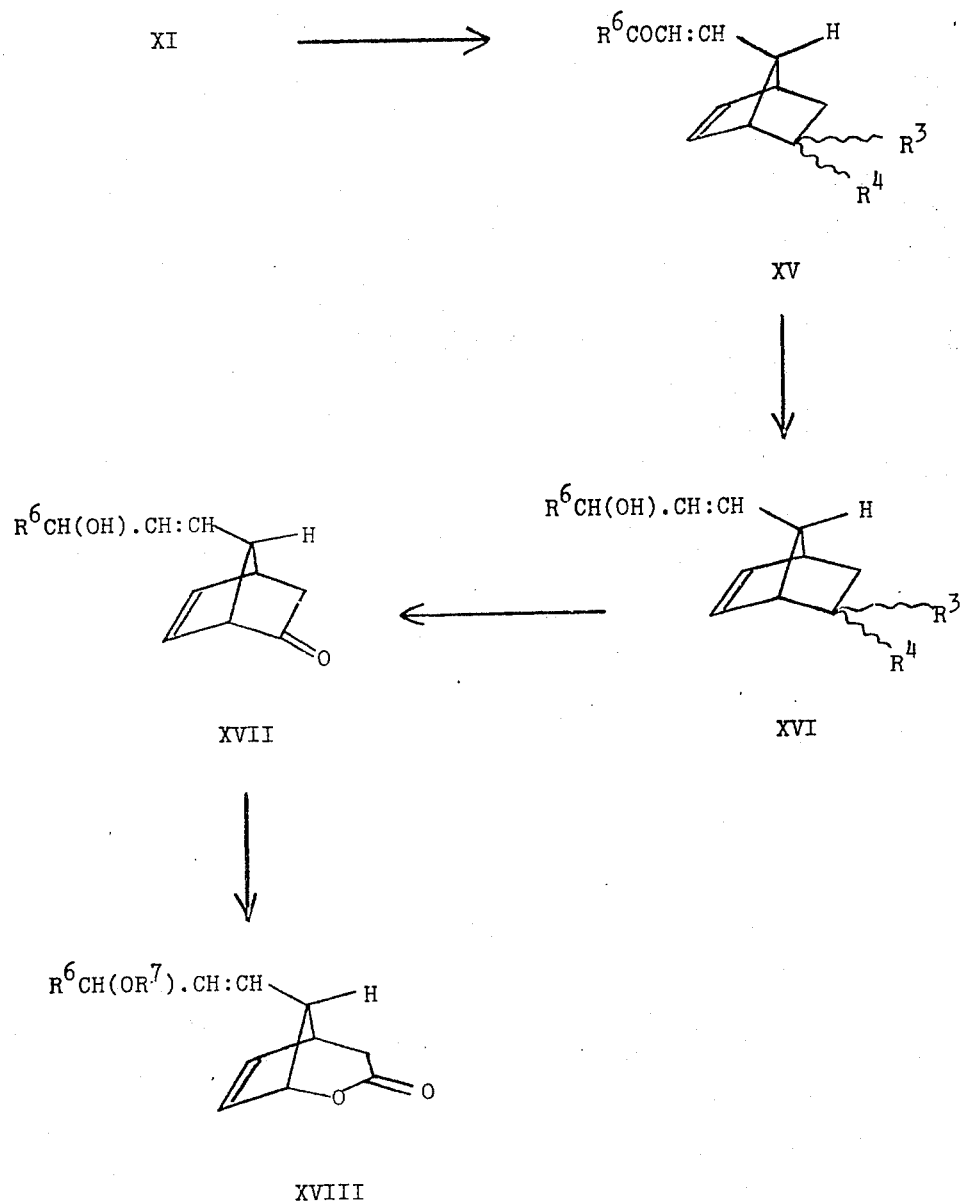

The double bond in the cyclopentene ring of such compounds XIX may, of course, be hydrogenated, or an earlier intermediate may be hydrogenated, so as to lead, in the same way, to 11-desoxy-prostaglandins or ample, di-isobornyloxy aluminium isopropoxide, followed by reaction of the enol with dihydropyran, gives the compound XIXb [$R^8$ = 3-(tetrahydropyran-2-yloxy)-1-trans-octenyl].

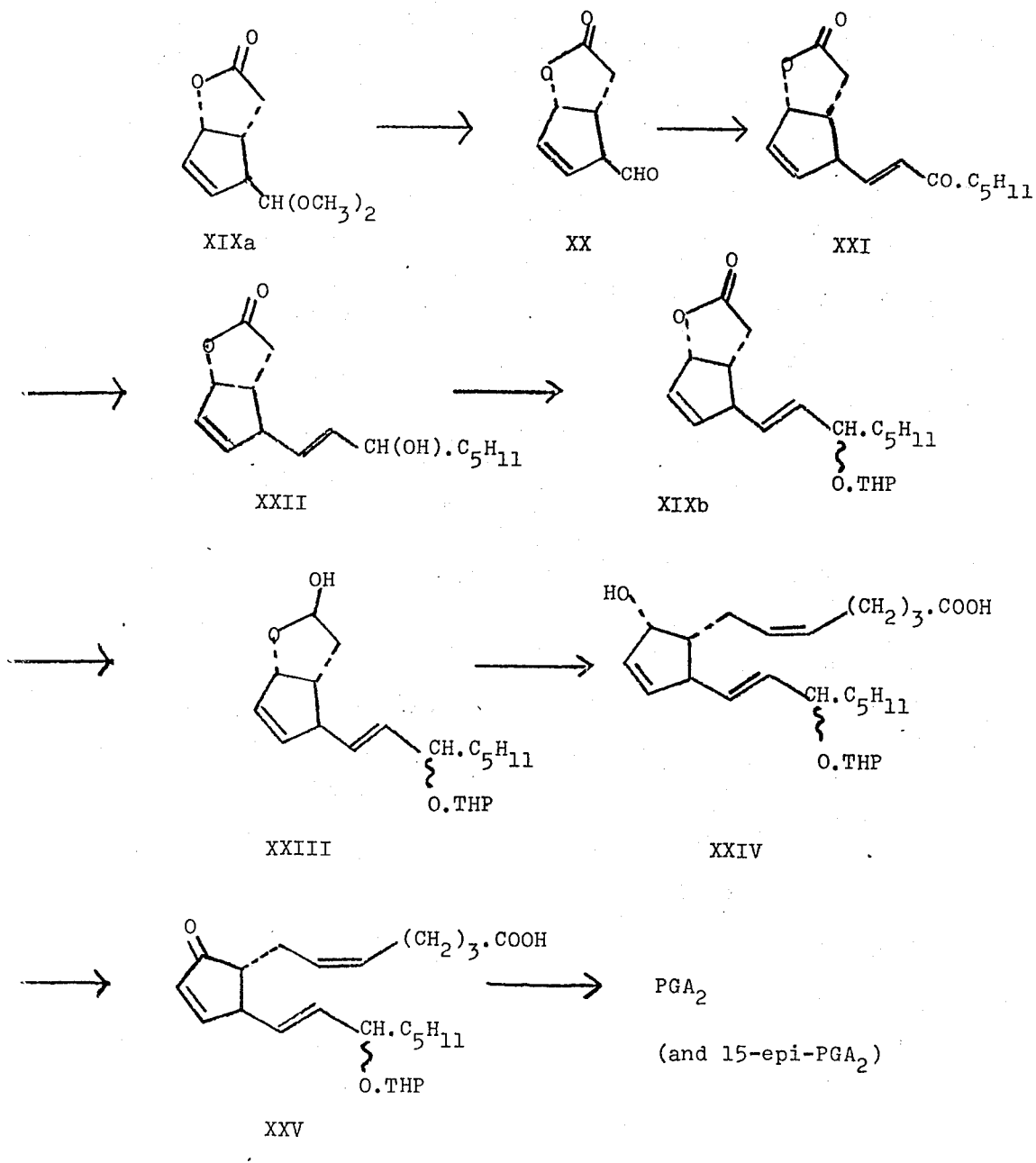

THP = tetrahydropyran-2-yl.

The compound XIXb [R⁸ = 3-(tetrahydropyran-2-yloxy)-1-trans-octenyl] may be converted to prostaglandin A$_2$, for example by reduction with di-isobutyl aluminium hydride to the lactol XXIII which is reacted with (4-carboxybutyl) triphenylphosphonium bromide and n-butyl-lithium in sulpholane to give the 9-hydroxyprostanoic acid derivative XXIV, and oxidation thereof with chromium trioxide in pyridine to the 9-oxo-compound XXV, followed by hydrolysis of the tetrahydropyranyl protecting group gives prostaglandin A$_2$.

In exactly the same way, 1,2,3,3α$\beta$,4,6α$\beta$-hexahydro-2-oxo-4$\beta$-[3-(tetrahydropran-2-yloxy)dec-1-trans-enyl]-1-oxapentalene, a homologue of compound XIXb, may be converted to 20-ethyl-prostaglandin A$_2$.

The conversion of the compound I (R¹ = benzyloxymethyl) to 11-desoxy-prostaglandin E$_2$ or to 11-desoxy-prostaglandin F$_2$α is already known. Compounds XIX, also, may be converted in completely analogous manner to prostaglandins, or prostaglandin-like compounds, of the 11-desoxy series.

The invention is illustrated, but not limited, by the following Examples:

EXAMPLE 1

8-Syn-dimethoxymethyl-3-oxo-2-oxabicyclo[3,2,1]-oct-6-ene (100mg.) and toluene-p-sulphonic acid (50mg.) were dissolved in dry benzene (7.5 ml.). The solution was stirred at room temperature for 6 minutes, washed with aqueous sodium bicarbonate solution and the organic phase separated. The organic extract was dried and the solvent was evaporated under reduced pressure to give 4$\beta$-dimethoxymethyl-1,2,3,3α$\beta$,4,6α$\beta$-hexahydro-2-oxo-1-oxapentalene (I, R¹ = dimethoxymethyl) as an oil, R$_F$ = 0.28 (thin-layer chromatography on silica gel, developed with 50% ether in benzene, the spots visualised by spraying the plates with ceric sulphate solution, and subsequent heating). The n.m.r. spectrum in deuteriochloroform showed the following characteristic features (δ values):

3.34, 6H, singlet, methoxy
4.10, 1H, doublet, —CH(OCH$_3$)$_2$
5.45, 1H, multiplet, C—6a proton
5.96, 2H, multiplet, C—4, 5 olefinic protons The 8-syn-dimethoxymethyl-3-oxo-2-oxabicyclo[3,2,1]-oct-6-ene used as starting material may be obtained as follows:

Crude α-acetoxyfulvene (61g., 0.45mole) was dissolved in benzene (450 ml., dried over 4A molecular sieves), and freshly distilled 2-chloroacrylonitrile (235 g., 2.68 moles) and hydroquinone (250 mg.) were added. The resulting solution was heated under reflux for 21 hours in an atmosphere of argon. The solvent was evaporated under reduced pressure to give a dark brown oil, which was purified by passage through a column of Florisil (1kg.) using methylene chloride as eluant, to give 7-acetoxymethylene-5-chlorobicyclo[2,2,1]hept-2-ene-5-carbonitrile as a pale yellow oil, $R_F = 0.4$ on thin layer chromatography on Merck silica gel plates, using methylene chloride as eluant. The n.m.r. spectrum of the product in deuteriochloroform showed the following features (δ values):

1.7–2.9, 2H, complex, protons at C-6
2.08 and 2.09, 3H, complex, methyl protons
3.3–4.2, 2H, complex, bridgehead protons
6.1–6.7, 2H, complex, ring olefinic protons
6.81 and 6.82, 1H, complex, acetoxymethylene olefinic proton 7-Acetoxymethylene-5-chlorobicyclo[2,2,1]hept-2-ene-5-carbonitrile, (35.8g.; 0.16.mole) was dissolved in dioxan (360ml., purified by passage through grade O basic alumina, followed by purging with argon) and 2N hydrochloric acid (80ml.; 0.16 mole, purged with argon prior to use) was added, giving a pale yellow solution. The solution was further purged with argon for 30 minutes, and was then heated in an oil bath, to maintain an internal temperature of 85°C. ± 3°C., for 4 days under an atmosphere of argon. The dioxan was evaporated under reduced pressure, and the residual liquid was basified with saturated aqueous sodium bicarbonate. Water (200ml.) and methylene chloride (120ml.) were added, and the resulting suspension was filtered through celite. The organic layer was separated, and the remaining aqueous solution was extracted with methylene chloride (4 × 50ml.). The organic layers were combined and dried, and the solvent was evaporated under reduced pressure. The residue was dried under high vacuum to give 5-chloro-7-syn-formylbicyclo[2,2,1]hept-2-ene-5-carbonitrile as a brown oil. The aldehyde mixture showed 2 spots having $R_F = 0.2$ and 0.3 respectively on thin layer chromatography on Merck 0.25mm. silica gel plates, using methylene chloride as eluant. The spots were detected by spraying the plates with ceric sulphate and then heating the plates. The n.m.r. spectrum in deuteriochloroform of the mixed aldehydes showed the following features (δ values):

1.79 and 2.26, 1H, doublets, J=14Hz, endo hydrogen at C–6
2.48 and 2.84, 1H, double doublets, J=14 and 6Hz, exo hydrogen at C–6
2.85 and 3.07, 1H, singlet, hydrogen at C–7
3.42, 1H, broad singlet, bridgehead hydrogen
3.66 and 3.80, 1H, broad singlet, bridgehead hydrogen
6.0–6.6, 2H, complex multiplets, olefinic hydrogens
9.50 and 9.57, 1H, doublets, J=1Hz, aldehyde hydrogen 5-Chloro-7-syn-formylbicyclo[2,2,1]hept-2-ene-5-carbonitrile (15g., 0.08mole), trimethyl orthoformate (26g., 0.25mole) and toluene-p-sulphonic acid (710mg., 4mmoles) were dissolved in methanol (500ml.), and the solution was heated under reflux for 20 hours. The solvents were evaporated under reduced pressure and the residual oil was dried under high vacuum using an oil pump, to give a mixture of epimeric 5-chloro-7-syn-dimethoxymethylbicyclo[2,2,1]hept-2-ene-5-carbonitrile.

5-Chloro-7-syn-dimethoxymethylbicyclo[2,2,1]hept-2-ene-5-carbonitrile (45.5g.) was dissolved in ethanol (450ml.) containing dimethyl sulphoxide (50ml., dried over 4A molecular sieves), sodium hydroxide (16.8g.) was added, and the solution was heated under reflux in an inert atmosphere for 20 hours. The solution was then cooled, diluted with water (500ml.) and extracted with methylene chloride (4 × 250ml.). The combined extracts were washed with water (4 × 500ml.) and dried, and the solvent was removed under reduced pressure to give an oil, which on crystallisation from pentane gave the ketone 7-syn-dimethoxymethyl-2-oxabicyclo[2,2,1]hept-5-ene, m.p. 45°C., $R_F = 0.4$ (5% ethyl acetate in methylene chloride). The n.m.r. spectrum of the ketone in deuteriochloroform showed the following characteristic features (δ values):

1.96, 2H, multiplet, —CH$_2$.CO—
2.52, 1H, doublet, C–7 proton
3.00, 1H, multiplet ⎫
3.10, 1H, multiplet ⎬ C–1 and C–4 protons
3.24, 3H, singlet ⎫
3.30, 3H, singlet ⎬ methoxy
4.38, 1H, doublet, (CH$_3$O)$_2$.CH—
5.98, 1H, multiplet ⎫
6.44, 1H, multiplet ⎬ olefinic protons The ketone (111g.) was dissolved in methylene chloride (1100ml.) containing sodium bicarbonate (130g.), and m-chloroperbenzoic acid (125g.) was added in portions to the stirred solution. The stirring was continued for 4 hours at room temperature, and the organic layer was washed successively with saturated sodium sulphite solution, sodium bicarbonate solution and water. The organic solution was dried, and the solvent was evaporated under reduced pressure to give 8-syn-dimethoxymethyl-3-oxo-2-oxabicyclo[3,2,1]oct-6-ene, $R_F = 0.3$ (5% ethyl acetate in methylene chloride). The n.m.r. spectrum in deuteriochloroform showed the following characteristic features (δ values):

3.3, 6H, singlet, methoxyl groups
4.05, 1H, doublet, —CH(OCH$_3$)$_2$
5.00, 1H, broad singlet, C–1 proton
6.2–6.9, 2H, multiplets, olefinic protons

EXAMPLE 2

The process described in Example 1 was repeated, using 2-oxo-8-syn-[3-(tetrahydropyran-2-yloxy)dec-1-trans-enyl]-1-oxabicyclo[3,2,1]oct-6-ene (25mg.) in place of the dimethoxy-methyl compound, 1.2mg. of toluene-p-sulphonic acid and 3ml. of benzene, and heating the mixture under reflux for 19 hours, to give 1,2,3,3aβ,4,6aβ-hexahydro-2-oxo-4β-[3-(tetrahydropyran-2-yloxy)dec-1-trans-enyl]-1-oxapentalene (I, R$^1$ = 3-(tetrahydropyran- 2-yloxy)- dec-1-trans-enyl), $R_F$ = 0.70 and 0.75 (epimers at C-3 of the 4β-side chain) on thin-layer chromatography on silica gel eluted with 10% ethyl acetate in methylene dichloride The n.m.r. spectrum in deuteriochloroform showed the following characteristic features (δ values):

0.90, 3H, triplet, methyl
4.64, 1H, multiplet, C-2 proton of tetrahydropyranyl group
5.08, 1H, multiplet, C-6a proton
5.50, 2H, multiplet, decenyl olefinic protons
5.95, 2H, multiplet, C-5 and C-6 olefinic protons The 2-oxo-8-syn-[3-tetrahydropyran-2-yloxy)dec-1-trans-enyl]-1-oxabicyclo[3,2,1]oct-6-ene used as starting material may be obtained as follows:

A solution of dimethyl 2-oxononylphosphonate (354mg., 1.4mmole) in anhydrous 1,2-dimethoxyethane (3.5ml.) at −78°C. was treated with n-butyl-lithium (0.94ml. of a 1.32M solution in hexane), and the mixture was stirred for 10 minutes, to this mixture was added a solution of 5-chloro-5-cyanobicyclo[2,2,1]hept-2-ene-7-syn-carboxaldehyde (203mg. 1.1 mmole) in 1.1-dimethoxyethane (2ml.). The reaction mixture was then allowed to warm up to room temperature and after being stirred for 1 hour was neutralised with glacial acetic acid. The solvents were evaporated under reduced pressure, and the residue was chromatographed on Florisil, using methylene dichloride as eluant to yield 5-chloro-5-cyano-7-syn-(3-oxodec-1-trans-enyl)-bicyclo[2,2,1]hept-2-ene, $R_F$ = 0.3 (methylene dichloride). The n.m.r. spectrum in deuteriochloroform showed the following characteristic features (δ values):

0.85, 3H, triplet, methyl group
1.55, 2H, broad triplet, —CO.CH$_2$—CH$_2$—
2.45, 2H, triplet, —CO—CH$_2$—CH$_2$—
6.10, 2H, doublet on multiplet, —CH.CO— and C-3 olefinic proton
6.38, 1H, multiplet, C-2 olefinic proton
6.7, 1H, multiplet, —CO—CH=CH—

A solution of the enone (102mg., 0.33mmole) and aluminum isopropoxide (648mg., 3.3mmole) in benzene/isopropanol (3:1)(8ml.) was heated in a bath at 80°C. Solvent was allowed to distil from the mixture, and was continuously replaced with benzene/isopropanol (3:1). After 5 hours, the reaction mixture was cooled stirred with saturated aqueous sodium hydrogen tartrate solution (25ml.) for 10 minutes, and diluted with brine/water (1:1) (5ml.). The mixture was extracted with ethyl acetate (4 × 5ml.), the combined extracts were dried and the solvent was evaporated under reduced pressure to give the enol, 5-chloro-5-cyano-7-syn-(3-hydroxydec-1-trans-enyl)bicyclo-[2,2,1]hept-2-ene, $R_F$ = 0.2 (methylene dichloride). The n.m.r. spectrum in deuteriochloroform showed the following characteristic features (δ values):

0.84, 3H, triplet, methyl
1.5-2.9, 2H, multiplet, C-6 protons
3.95, 1H, broad, >CH(OH)
5.51, 2H, multiplet, -CH=CH.CH(OH)-
6.02, 1H, multiplet,⎤
6.32, 1H, multiplet,⎦ C-2 and C-3 protons To a solution of the enol (243mg., 0.179mmole) in dimethyl sulphoxide (2.4ml.) was added an aqueous solution of potassium hydroxide (8.6N, 0.19ml., 1.7mmole), and the resulting mixture was stirred for 18 hours, in an inert atmosphere. The reaction mixture was then diluted with water (5ml.) and extracted with ether (4 × 5ml.). The combined extracts were washed with water (2 × 3ml.) and dried, and the solvent was evaporated under reduced pressure to yield 7-syn-(3-hydroxydec-1-trans-enyl)bicyclo[2,2,1]hept-2-en-5-one, $R_F$ = 0.3 (10% ethyl acetate in methylene dichloride). The n.m.r. spectrum in deuteriochloroform showed the following characteristic features (δ values):

0.87, 3H, triplet, methyl
2.00, 2H, multiplet, C-6 protons
3.99, 1H, multiplet, >CH(OH)
5.6, 2H, multiplet, —CH=CH.CH(OH)—
5.90, 1H, multiplet,⎤
6.41, 1H, quartet,⎦ C-2 and C-3 protons The enol ketone (58mg., 0.22mmole) was dissolved in dry methylene dichloride (1mc.) containing dihydropyran (0.1ml.). A solution of toluene-p-sulphonic acid in tetrahydrofuran (0.05ml. of 1.0% solution) was added, and the mixture allowed to stand for 5 minutes. Pyridine (1 drop) was then added followed by ethyl acetate (10ml.). The mixture was then washed successively with saturated sodium bicarbonate solution and brine, and was dried, and the solvents were evaporated under reduced pressure to give 7-syn-[32-yloxy)dec-1-trans-enyl]-2-oxabicyclo[2,2,1]hept-5-ene, $R_F$ = 0.3 and 0.4 (5% ethyl acetate in methylene dichloride). The n.m.r. spectrum in deuteriochloroform showed the following characteristic features (δ values):

0.85, 3H, triplet, methyl
2.00, 2H, multiplet, C-3 protons
4.6, 1H, multiplet, C-2 proton of tetrahydropyranyl
5.2-5.7, 2H, multiplet, olefinic protons of 7-decenyl
5.9, 1H, multiplet⎤
6.4, 1H, multiplet⎦ C-5 and C-6 olefinic protons The tetrahydropyranyl ether (60mg., 0.17mmole) was dissolved in methylene dichloride (3ml.) containing solid sodium bicarbonate (29mg., 0.34mmole). The stirred mixture was cooled to 0°C., m-chloroperbenzoic acid (33mg., 0.18mmole) was added and the mixture was stirred at (0°C. for 3 days. Saturated sodium sulphite solution was added, the organic layer was separated and dried, and the solvent was evaporated under reduced pressure to give 2-oxo-8-syn-[3-(tetrahydropyran-2-yloxy)-dec-1-trans-enyl]-1-oxabicyclo[3,2,1]oct-6-ene, $R_F$ of epimers = 0.3 and 0.4 (2½% methanol in methylene dichloride). The n.m.r. spectrum showed the following characteristic features (δ values):

5.85, 3H, triplet, methyl
4.6, 1H, multiplet, C-2 proton of tetrahydropyranyl
5.9-6.6, 4H, multiplet, olefinic protons.

EXAMPLE 3

The process described in Example 1 was repeated, using 8-syn-benzyloxymethyl-3-oxo-2-oxabicyclo[3.2,1]-oct-6-ene in place of 8-syn-dimethoxymethyl-3-oxo-2-oxabocyclo[3,2,1]oct-6-ene, to give the known 4β-benzyloxymethyl-1,2,3,3aβ,4,6aβ-hexahydro-2-oxo-1-oxapentalene, $R_F$ = 0.7 (ether). The mass spectrum showed M⁻ = 244.1115 (calculated for $C_{15}H_{16}O_3$ = 244.1099). The n.m.r. spectrum in deuteriochloroform showed the following characteristic features (δ values):

3.44, 2H, multiplet, PhCH$_2$OCH$_2$-CH<

4.52, 2H, singlet, PhC$\underline{H}_2$O—
5.5, 1H, multiplet, C–6αβ proton
6.0, 2H, multiplet, olefinic protons
7.3, 5H, singlet, aromatic protons

EXAMPLE 4

4β-Dimethoxymethyl-1,2,3,3αβ,4,6αβ-hexahydro-2-oxo-1-oxapentalene (1.49g.) was stirred with 2N hydrochloric acid (18.6ml.) at room temperature for 15 minutes. An excess of solid sodium bicarbonate was added, followed by solid sodium chloride. The resulting solid material was triturated thoroughly with ethyl acetate (5 × 20ml.) the combined organic solutions were dried, and the solvent was evaporated under reduced pressure to yield 4β-formyl-1,2,3,3αβ,4,6αβ-hexahydro-2-oxo-1-oxapentolene as an oil, $R_F$ = 0.1 (ether). The n.m.r. spectrum of the aldehyde in deuteriochloroform showed the following characteristic features (δ values):

3.55, 1H, broad singlet, C–4α proton
5.50, 1H, broad doublet, C–6αβ proton
6.10, 2H, multiplet, olefinic protons
9.60, 1H, doublet, aldehyde proton A solution of dimethyl 2-oxoheptylphosphonate (2.16g.) in anhydrous 1,2-dimethoxyethane (60ml.) at −78°C. was treated with n-butyl-lithium (3.16ml. of 2.29M solution in hexane), the mixture was stirred for 10 minutes, and a solution of the crude aldehyde (1.00g.) in 1,2-dimethoxyethane (20ml.) was added. The reaction mixture was then allowed to warm up to room temperature, and after 4 hours was neutralized with glacial acetic acid. The solvents were evaporated under reduced pressure and the residue was partitioned between methylene dichloride (100ml.) and brine (20ml.). The aqueous layer was separated, extracted twice with methylene dichloride, the combined organic extracts were dried, and the solvent was evaporated under reduced pressure. The residue was chromatographed on silica gel, and elution with 5% ethyl acetate in methylene dichloride gave the enone, 1,2,3,3αβ,4,6-αβ-hexahydro-2-oxo-4β-(3-oxooct-1-trans-enyl)-1-oxapentalene, $R_F$ = 0.8 (5% ethyl acetate in methylene dichloride). The n.m.r. spectrum in deuteriochloroform showed the following characteristic features (δ values):

0.89, 3H, triplet, methyl
3.42, 1H, broad doublet C–4α proton
5.56, 1H, broad doublet, C–6αβ proton
6.01, 2H, singlet, C–5 and C–6 protons
6.08, 1H, doublet, —CH:C$\underline{H}$.CO—
6.66, 1H, quartet, —C$\underline{H}$:CH.CO—

A solution of the enone (1.28g.) in toluene (50ml.) was treated with a toluene solution of di-isobornyloxy aluminium isopropoxide (40ml., 0.323M) at room temperature for 2 hours. The solution was then diluted with ethyl acetate (100ml.) and stirred for a short time with a saturated solution of sodium hydrogen tartrate. The mixture was filtered, the organic phase was separated and dried, the solvent was evaporated under reduced pressure and the residue was chromatographed on silica gel. Elution with ethyl acetate/methylene dichloride (75:25) gave the enol, 1,2,3,3αβ,4,6αβ-hexahydro-4β-(3-hydroxyoct-1-trans-enyl)-2-oxo-1-oxapentalene as a mixture of epimers at C–3 of the side chain, $R_F$ = 0.2 and 0.3 (5% ethyl acetate in methylene dichloride). The n.m.r. spectrum in deuteriochloroform showed the following characteristic features (δ values):

0.85, 3H, triplet, methyl
1.84, 1H, singlet, hydroxy
3.23, 1H, broad, C–4α proton
4.05, 1H, broad, $>$C$\underline{H}$.OH
5.52, 3H, multiplet, C–6αβ and side chain olefinic protons
5.95, 2H, multiplet, C–5 and C–6 protons To a solution of the epimeric enols (631mg.) in anhydrous methylene dichloride (9.5ml.) under an atmosphere of nitrogen, were added successively redistilled 2,3-dihydropyran (1.89ml.) and a solution of anhydrous toluene-p-sulphonic acid in tetrahydrofuran (0.16 ml. of a 1% solution). After 15 minutes, pyridine (3 drops) was added, followed by ethyl acetate (50ml.). The solution was washed successively with saturated sodium bicarbonate solution and saturated brine, and was dried. Evaporation of the solvents under reduced pressure gave a mixture of the epimeric tetrahydropyranyl ethers of the enols, $R_F$ = 0.8 (5% ethyl acetate in methylene dichloride). The n.m.r. spectrum in deuteriochloroform showed the following characteristic features (δ values):

0.87, 3H, triplet, methyl
3.25, 1H, broad, C–4α proton
3.3–4.1, 3H, multiplet, $>$C$\underline{H}$–O–
4.62, 1H, broad, C–2 proton of tetrahydropyranyl
5.1–5.7, 3H, multiplet, C–6αβ and side-chain olefinic protons.
5.95, 2H, multiplet, C–5 and C–6 protons.

To a solution of the crude epimeric tetrahydropyranyl ethers (800mg.) in dry toluene (50ml.) under an atmosphere of argon at −78°C. was added a solution of di-isobutyl aluminium hydride (1.47ml. of 1.96M solution in toluene). After 15 minutes, the reaction was quenched by dropwise addition of methanol (1ml.) and after a further 15 minutes at room temperature a mixture of 1:1 brine/water (10ml.) was added. The mixture was extracted with ethyl acetate (3 × 10ml.), the combined organic extracts were washed with brine and dried, and the solvents were evaporated under reduced pressure to give an epimeric mixture of lactols, 1,2,3,3-αβ,4,6αβ-hexahydro-2-hydroxy-4β-(3-hydroxyoct-1-trans-enyl)-1-oxapentalene as an oil $R_F$ = 0.5 (5% methanol in methylene dichloride). The n.m.r. spectrum in deuteriochloroform showed the following characteristic features (δ values):

0.88, 3H, triplet, methyl
3.1, 1H, broad, C–4α proton
4.66, 1H, broad, C–2 proton of tetrahydropyranyl
5.52, 2H, multiplet, side-chain olefinic protons
5.76, 2H, multiplet, C–5 and C–6 protons.

Finely powdered (4-carboxybutyl)triphenylphosphonium bromide (1.75g.) was heated to 100°C. under vacuum for 1 hour. The evacuated vessel was then filled with dry nitrogen, and the solid was dissolved in warm anhydrous sulpholane (20ml.). To this warm solution was added dropwise n-butyl-lithium (3.25ml. of a 2.29M solution in hexane) and the mixture was stirred for 1 hour at room temperature. To this mixture was added a solution of the epimeric lactols (500mg.) in a mixture of sulpholane (6ml.) and toluene (2ml.) and the solution was stirred at room temperature for 1 hour. Water (10ml.) was added, the mixture was extracted with ether (4 × 10ml.), and the extracts were discarded. The aqueous solution was then acidified to pH 3 with 2N aqueous oxalic acid and then extracted with a mixture of equal parts of ether and pentane (3 × 50ml.). The combined organic extracts were dried, the solvents were evaporated under reduced pressure, and residual sulpholane was removed by pumping under high vacuum. The residue was then chromatographed on silica gel, and elution with a mixture of acetone and cyclohexane (20:80) gave the hydroxy acid, 9α-hydroxy-15-(tetrahydropyran-2-yloxy)-5-cis, 10,13-trans-prostatrienoic acid, as an oil, $R_F = 0.3$ (10% methanol in methylene dichloride). The n.m.r. spectrum in deuteriochloroform showed the following characteristic features (δ values):

0.90, 3H, triplet, methyl
3.05, 1H, broad, C-12α proton
4.80, 1H, broad, C-2 proton of tetrahydropyranyl
5.3-6.0, 6H, multiplet, olefinic protons.

A mixture of anhydrous methylene dichloride (860μl.), anhydrous pyridine (55μl.) and chromium trioxide (34.3mg.) was stirred at room temperature under an atmosphere of argon for 15 minutes. A solution of the hydroxy acid (24mg.) in methylene dichloride (200μl.) was added, and the mixture was stirred for 15 minutes. The organic layer was decanted and the residue was washed with ether (2 × 2 ml.). The combined organic layers were washed successively with 1N hydrochloric acid (2ml.) and brine (2 × 3 ml.), and dried, and the solvents were evaporated under reduced pressure. The residue was chromatographed on silica gel (Mallinckrodt CC4), and elution with a mixture of ether and pentane (1:1) gave the keto acid, 9-oxo-15-(tetrahydropyran-2-yloxy)-5-cis, 10,13-trans-prostatrienoic acid, as an oil, $R_F = 0.3$ (5% methanol in methylene dichloride). The n.m.r. spectrum in deuteriochloroform showed the following characteristic features (δ values):

0.89, 3H, triplet, methyl
3.26, 1H, broad, C-12α proton
3.4-4.2, 3H, multiplet, C-15, and C-6 of tetrahydropyranyl, protons.
4.67, 1H, broad, C-2 of tetrahydropyranyl
5.42, 2H, multiplet, side-chain trans-olefinic protons
5.59, 2H, multiplet, cis-olefinic protons
6.17, 1H, multiplet, C-11 proton
7.48, 1H, multiplet, C-10 proton A mixture of the keto-acid (6.2mg.), acetic acid (240μl.) and water (120μl.) was heated at 50°C. for 1 hour under an atmosphere of nitrogen. The solvent was then evaporated under reduced pressure the residue was taken up in ether, and the ether solution was washed with brine. The separated organic phase was dried, and the solvent was evaporated under reduced pressure to give the C-15 epimers of 15-hydroxy-9-oxo-5-cis,10,13-transprostatrienoic acid. The epimers were separated by thin layer chromatography on silica gel using 1% acetic acid in ether as the eluting solvent. The more polar spot, $R_F = 0.40$, was a mixture of cis-trans epimers in the top side-chain, which were separated by chromatography on silver nitrate impregnated silica-gel. The trans isomer was identical, except for optical activity, with authentic prostaglandin $A_2$. The n.m.r. spectrum in hexadeuterio-acetone showed the following characteristic features (δ values):

0.90, 3H, triplet, methyl
3.31, 1H, multiplet, C-12α proton
4.05, 1H, multiplet, C-15 proton
5.45, 2H, multiplet, C-5 and C-6 protons
5.64, 2H, multiplet, C-13 and C-14 protons
6.12, 1H, multiplet, C-11 proton
7.59, 1H, double doublet, C-10 proton

What we claim is:
1. A process for the production of cyclopentene intermediates of the formula:

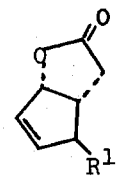

wherein $R^1$ is selected from the group consisting of dialkoxymethyl of 3 to 8 carbon atoms and 3-(tetrahydropyran-2-yloxy)-1-trans-alkenyl wherein the alkenyl part is of 4 to 11 carbon atoms, which intermediates are useful for the manufacture of prostaglandins, or prostaglandin-like compounds, of the A-series or of the 11-desoxy series, which comprises reacting an oxabicyclo-octene of the formula:

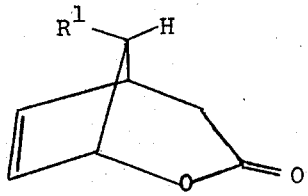

wherein $R^1$ has the meaning stated above, with an acid.

2. The process of claim 1 wherein in the starting material $R^1$ is dimethoxymethyl, 3-(tetrahydropyran-2-yloxy)-1-trans-octenyl or 3-(tetrahydropyran-2-yloxy)-1-trans-decenyl.

3. The process of claim 1 wherein the acid is toluene-p-sulphonic acid.

4. A cyclopentene derivative of the formula:

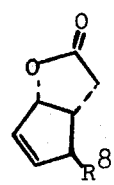

wherein $R^8$ is selected from the group consisting of dialkoxymethyl of 3 to 8 carbon atoms and 3-(tetrahydropyran-2-yloxy)-1-trans-alkenyl wherein the alkenyl part is of 4 to 11 carbon atoms.

5. The cyclopentene derivative of claim 4 which is 4β-dimethoxymethyl-1,2,3,3αβ,4,6αβ-hexahydro-2-oxo-1-oxapentalene.

6. The cyclopentene derivative of claim 4 which is 1,2,3,3αβ,4,6αβ-hexahydro-2-oxo-4β-[3-(tetrahydropyran-2-yloxy)oct-1-trans-enyl]-1-oxapentalene or 1,2,3,3αβ,4,6αβ-hexahydro-2-oxo-4β-[3-(tetrahydropyran-2-yloxy)dec-1-trans-enyl]-1-oxapentalene.

* * * * *